US006542955B1

(12) United States Patent
Chen

(10) Patent No.: US 6,542,955 B1
(45) Date of Patent: Apr. 1, 2003

(54) MICROCONTROLLER VIRTUAL MEMORY SYSTEM AND METHOD

(75) Inventor: Stanley L. Chen, Cupertino, CA (US)

(73) Assignee: Programmable Microelectronics Corporation, San Jose, CA (US)

( * ) Notice: Subject to any disclaimer, the term of this patent is extended or adjusted under 35 U.S.C. 154(b) by 0 days.

(21) Appl. No.: 09/325,027

(22) Filed: Jun. 3, 1999

(51) Int. Cl.[7] .............................................. G06F 12/00
(52) U.S. Cl. ......................... 711/102; 711/104; 713/2
(58) Field of Search .............................. 711/100, 101, 711/102, 103, 104, 105; 365/185.33; 713/1, 2

(56) References Cited

U.S. PATENT DOCUMENTS 5,519,843 A   5/1996   Moran et al.
5,657,467 A   8/1997   Hasegawa

OTHER PUBLICATIONS

Silicon Storage Technology, Inc. "FlashFlex51 MCU SST89F54/SST89F58 Preliminary Specifications" Feb. 1999, 44 pages.
"FlashFlex51 MCU SST89F54/SST89F58 Preliminary Specifications", ©1999 Silicon Storage Technology, Inc. 2/99 printing, 44 pages.

"8–Bit Microcontroller with 8K Bytes Flash AT89S8252", Atmel, 12/97, pp. 4–105–4–135.
"AT89S8252 Primer Application Note", Atmel, 3/98, 13 pages.
"MCS®–51 Family of Microcontrollers Architectural Overview", Intel, Feb. 1994, pp. 5–2 to 5–21.

Primary Examiner—Matthew Kim
Assistant Examiner—Matthew D. Anderson
(74) Attorney, Agent, or Firm—MacPherson Kwok Chen & Heid LLP

(57) ABSTRACT

A microcontroller memory system that provides on-chip, non-volatile memory for internal data and program code storage in such a manner that all on-chip, non-volatile memory is efficiently utilized. In one embodiment, a microcontroller memory scheme allows internal program code and data stored in the non-volatile memory to be reprogrammed in place by software executing on the microcontroller or by external devices through the microcontroller's serial port. In another embodiment, data and program code stored in the internal program area can be accessed using any instruction employed to access via an internal data bus the contents of an on-chip, volatile memory. The non-volatile memory used to store the program code and internal data can be implemented with Flash memory or EEPROM. To enable compatibility with conventional 8051 controllers, a flag in a special function register is provided that indicates whether a memory access is to be into the non-volatile memory or, in the conventional manner, into internal volatile or external volatile memory used for data (as opposed to program) storage.

6 Claims, 8 Drawing Sheets

Traditional 8051 Memory Scheme

NVM 200

| | |
|---|---|
| Program Area | 330 |
|    Internal Programs | 340 |
|    Data for Internal Programs | 350 |
| Data Area | 360 |
|    Internal Data | 370 |
| Boot Program Section | 380 |
|    Interrupt Service Routine | 382 |
|       RX Interrupt Handler | 384 |
|       TX Interrupt Handler | 386 |
|    Boot Programs | 388 |

FIG. 5

MICROCONTROLLER VIRTUAL MEMORY SYSTEM AND METHOD

The present invention relates generally to microcontrollers and, particularly, to the use and management of on-chip non-volatile memory.

BACKGROUND OF THE INVENTION

Traditionally, microcontrollers that are compatible with the industry standard 8051 architecture assume a memory organized into four address spaces, each with corresponding physical memory circuits. The four address spaces correspond to: internal program code, internal data, external program code and external data. In this context, "internal" means code or data that is stored in controller on-chip memory and "external" means code or data that is stored in off-chip memory. An illustration of the conventional 8051 memory organization is shown in FIG. 1.

Referring to FIG. 1, the internal program memory 102 is typically implemented as mask-ROM 120 or other non-volatile memory, the internal data memory 106 as 128 or 256 bytes of SRAM plus a special function register (SFR) array 140, and the external program and data memories 104,108 each as up to 64K bytes of SRAM 110, 112. The internal data can be read and written by internal programs or external programs via an internal memory bus. The internal program code, which is read-only, can be fetched over the same internal bus. The external program code, which is read-only, can be fetched over an external bus. The external data can be read and written by external programs or internal programs via the same external bus.

Each area of memory is accessed in response to particular instructions. For example, internal program code is fetched via the internal data bus one byte at a time in response to a move ode (MOVC) instruction, and no other instruction, issued by an internal or external program. The MOVC instruction has two different formats:

| Format | Description |
| --- | --- |
| MOVC @ (A + DPTR) | move onto the internal bus a byte of the program code from the internal program memory at the address given by the sum of the Accumulator part of the MOVC instruction (A) and the contents of the data pointer DPTR, which is a 16-bit value. |
| MOVC @ (A + PC) | move a byte of the program code from the internal program memory at the address given by the sum of the Accumulator A and the contents of the program counter register PC, which is a 16-bit value. |

Internal and external program code reads are differentiated by the location of the fetched code byte. CPU will detect whether the code is in internal or external program memory and fetch the code accordingly.

Internal data is fetched and written via the internal bus using a wide range of memory access instructions issued by an internal or external program in one of four addressing modes:

| Address Mode | Description |
| --- | --- |
| Register Mode | Data is stored in one of the registers R0–R7 in the selected register bank (4 register banks each with 8 registers). |
| Direct Mode | Data is stored in either an SFR or a location in the lower 128 bytes of the internal SRAM. |
| Indirect Mode | Data is stored in a location in the 256 bytes of the internal SRAM. The address is stored in a register. |
| Indexed Mode | Data is stored in a location addressed by the sum of a base register (program counter PC or Data Pointer DPTR) and the Accummulator as the index register. |

External Program code is fetched via the external bus in response to a move code (MOVC) instruction issued by an internal or external program. The MOVC instruction has two different formats:

| Format | Description |
| --- | --- |
| MOVC @ (A + DPTR) | move a byte of the program code from the external data memory at the address given by the sum of the Accumulator A and the contents of the register DPTR, which is a 16-bit value. |
| MOVC @ (A + PC) | move a byte of the program code from the external data memory at the address given by the sum of the address A and the contents of the program counter register PC, which is a 16-bit value. |

The external data is fetched and written via the external data bus in response to a move external (MOVX) instruction issued by an external or internal program. The MOVX instruction has 16-bit and 8-bit formats:

| Format | Description |
| --- | --- |
| MOVX @ DPTR | move the data from the external data memory at the address given by the contents of the 16-bit register DPTR. |
| MOVX @ Ri | move the data from the external data memory at the address given in the 8-bit register Ri (i=0 or 1) of the selected register bank. |

For additional information on the MCS-51 family of controllers, please see the publication, "MCS®-51 Microcontrollers Family User's Manual (published by Intel, February, 1994) p. 1-1 to p. 2-75.

Given this architecture, traditional 8051 microcontrollers cannot be used in applications where it is necessary to retain internal data in the absence of a power-supply. This problem has been addressed in the Atmel C51 family of microcontrollers (i.e., the 89S8252 and 89LS8252), which is now described with reference to FIG. 2. Additional information on memory organization and programming in the Atmel C51 family of microcontrollers is provided in the following documents, which are incorporated herein by reference:

(1) "AT89S8252 Primer," Atmel Application Note, Rev. 1018A-03/98; and (2) "8-Bit Microcontroller with 8K Bytes Flash, AT89S8252," pp. 4-105 to 4-135, Atmel AT89-series Microcontroller Databook, Rev. 0401D-A-12/97.

Referring to FIG. 2, the Atmel C51 family of microcontrollers implements the 8051 memory organization of FIG. 1 using four separate memory circuits 162–168, but uses non-volatile Flash memory 170 for the internal program code memory and non-volatile EEPROM 174 and SRAM 180 for the internal data memory. This arrangement ensures that the internal data can be maintained in the absence of power and can be reprogrammed.

Access to all but the internal data is the same as in the traditional 8051 memory scheme. The internal data SRAM 180 can be accessed using the same range of memory access instructions and access modes described above (register, direct, indirect). Additionally, Atmel allows the internal EEPROM 174 to be accessed through the MOVX instruction which, in the traditional 8051 architecture, is used to access only the external data memory 168. In the Atmel scheme, access to the internal EEPROM 174 via the MOVX instruction is enabled when an EEMEN bit in the special function register (SFR) 190 is set. When the EEMEN bit is cleared, the MOVX instruction accesses the external data memory 168.

The Atmel memory scheme provides non-volatile memory for internal data in a manner that is consistent with the traditional 8051 memory organization scheme and memory access instructions. However, due to the Flash (program) and EEPROM (data) memories 170, 174 being physically distinct, the situation could arise where there is not enough room for internal data storage in the EEPROM 174 even though there is room in the Flash memory 170 (and vice-versa for internal program code storage). As a result, this scheme does not make efficient use of the relatively expensive, on-chip non-volatile memory 170, 174. Also, while data can be stored in the internal program Flash memory, the usefulness of such data is limited as it would be read-only during program execution. Once the data in the program area is programmed it cannot be altered until the whole program is reprogrammed.

Additionally, it is difficult to reprogram the Flash memory 170 to update the programs or data stored therein. This is because the Flash memory 170 can only be reprogrammed on block basis, i.e., updating any byte in the Flash memory requires erasing the entire block first. Among other things, this prevents the Flash memory 170 from being programmed by software executing on the microcontroller or by external devices through the microcontroller's serial port. Additionally, it would not be practical to program a Flash memory in this byte-by-byte fashion.

Therefore, there is a need for an 805 1-compatible microcontroller that provides on-chip, non-volatile memory for internal data and program code storage in such a manner that all on-chip, non-volatile memory is efficiently utilized. There is also a need for an microcontroller memory scheme that allows internal program code and data stored in the non-volatile memory to be reprogrammed in place by software executing on the microcontroller or by external devices through the microcontroller's serial port. There is a further need for a microcontroller memory in which data and program code stored in the internal program area is easily accessed and reprogrammed. Finally, there is a need for a memory access scheme for program code and data stored in the non-volatile program area that can be implemented using Flash memory or EEPROM.

SUMMARY OF THE INVENTION

In summary, the present invention is a microcontroller memory system that provides on-chip, non-volatile memory for internal data and program code storage in such a manner that all on-chip, non-volatile memory is efficiently utilized. In one embodiment, a microcontroller memory scheme allows internal program code and data stored in the non-volatile memory to be reprogrammed in place by software executing on the microcontroller or by external devices through the microcontroller's serial port. In another embodiment, data and program code stored in the internal program area can be accessed using any instruction employed to access via an internal data bus the contents of an on-chip, volatile memory used to store internal data.

In any of the embodiments, the non-volatile memory used to store the program code and internal data can be implemented with EEPROM.

A particular embodiment of a microcontroller memory system implemented in accordance with the present invention includes an internal volatile memory and an internal non-volatile memory. In this embodiment, the internal volatile memory is used to store internal data and the internal non-volatile memory is used to store in any proportion internal non-volatile data and/or internal program code. The data and program code are stored in the internal non-volatile memory so as to be accessible to any microcontroller instruction that can access the internal data in the internal volatile memory. In one embodiment, the contents of the non-volatile memory can be programmed by an external device via the microcontroller's serial port. In another embodiment, the contents of the non-volatile memory can be programmed by software executing on the microcontroller.

One particular embodiment is a virtual memory system for use in a microcontroller with a memory architecture that includes internal data and internal program address spaces, both of which are accessible by data transfer instructions. This embodiment includes a single, internal non-volatile memory configured to store both internal data and internal program code for access via the internal data and internal program code address spaces, respectively.

Another embodiment of the virtual memory system includes, in addition to the internal non-volatile memory, an internal volatile memory that is also configured to store the internal data for access via the internal data address space. Any of the embodiments with both internal volatile and non-volatile data memory can include a special function register with a flag that indicates whether an internal data access is to be into the internal non-volatile memory or the internal volatile memory.

Alternatively, a flag implemented by a special function register bit can indicate whether a data access is into the non-volatile memory or an external volatile data memory. This embodiment supports a set of one or more internal memory access modes and a set of one or more external memory access modes distinct from the internal access modes. When the flag indicates that a data access is to be into the volatile memory, the data access is into the internal volatile memory when a program executing on the microcontroller employs one of the internal memory access modes and into the external memory when the program employs one of the external access modes.

BRIEF DESCRIPTION OF THE DRAWINGS

Additional objects and features of the invention will be more readily apparent from the following detailed description and appended claims when taken in conjunction with the drawings, in which:

FIG. 5 is a block diagram illustrating contents of the non-volatile memory 220 of FIG. 4;

DESCRIPTION OF THE PREFERRED EMBODIMENT

Figure 3:
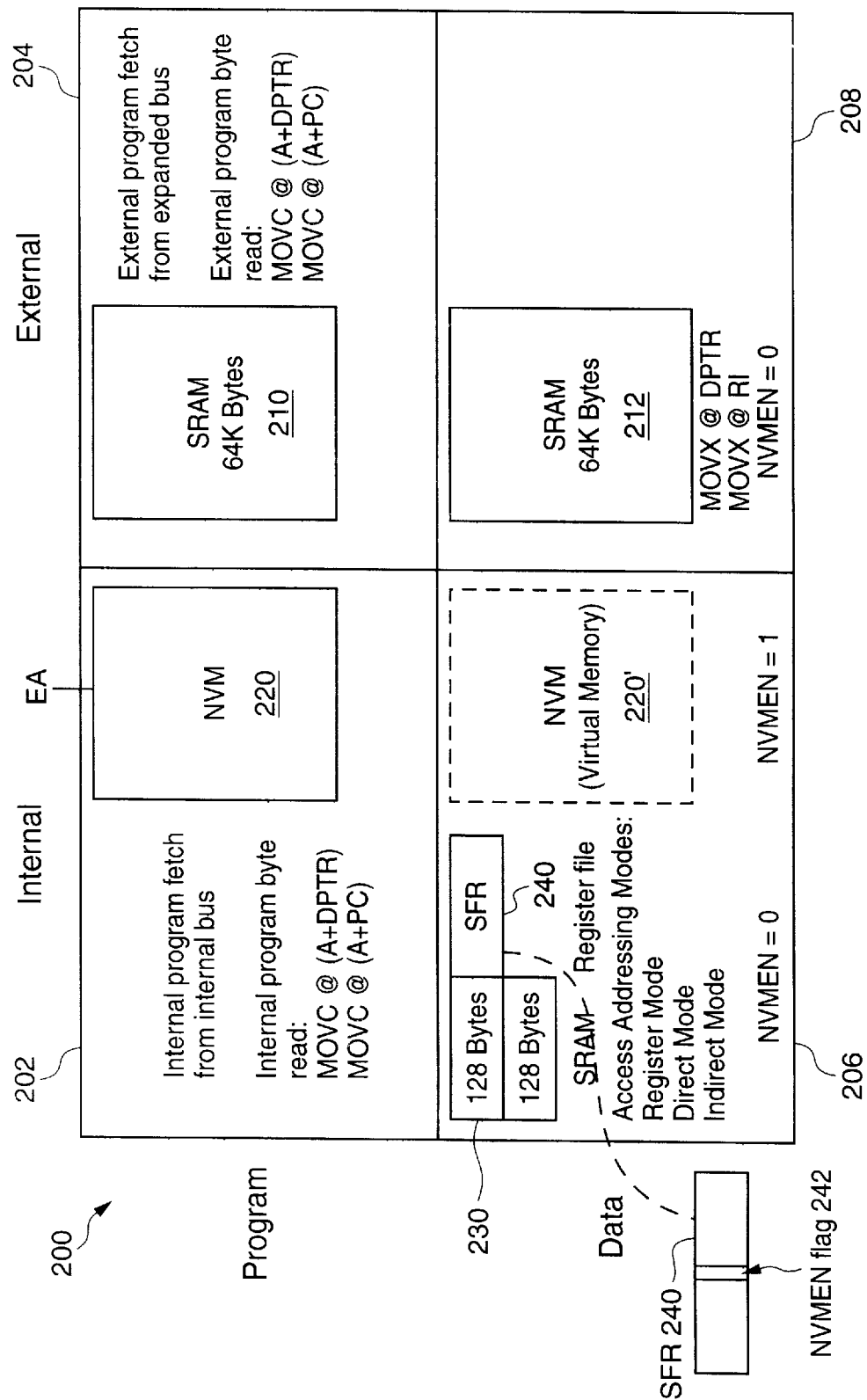
FIG. 3 is a block diagram showing an embodiment of the microcontroller memory scheme of the present invention.

Referring to FIG. 3, there is shown a block diagram of an embodiment of the microcontroller memory scheme of the present invention. This scheme assumes the same four memory areas/address spaces as the prior art: internal program 202, external program 204, internal data 206 and external data 208. As in the prior art, the external program and the external data areas 204, 208 are implemented using SRAM circuits 210, 212. A significant difference over the prior art is that the internal program and data areas 202, 206 share a single non-volatile memory (NVM) 220 (the NVM block 220' is shown in dashed lines, indicating that it is accessed as virtual memory mapped to the NVM 220; all subsequent references to the NVM shall be to the NVM 220 alone and shall assume the virtual memory arrangement). In various embodiments, the NVM 220 can be EEPROM, or another type of non-volatile memory that can be accessed on a byte-addressable basis. The byte addressing capability can be emulated by a block based NVM (i.e., any change of the NVM contents requires first erasing the contents of the whole block in which the change is located) by using a sector/page-based NVM (e.g., 64 bytes per sector) and read-modify-write operation (i.e., read the entire sector into a temporary buffer, modify its contents and then write the buffer back to NVM). Among other benefits, writing one byte of data into a byte-addressable memory does not require erasing the entire memory first. As in the prior art, the internal data area 206 includes a volatile memory 230 and a special function register array (SFR) 240.

The NVM 220 can be used to store both internal data and internal program code in any proportion. That is, the NVM 220 can be used to store X percent internal data and 100-X percent internal program code, where X can be any value between 0 and 100. This flexible arrangement allows the relatively-expensive, non-volatile memory 220 to be efficiently configured to accomodate whatever amount of internal data and program code need to be stored (up to the size of the NVM 220). The present memory access scheme therefore has many advantages over the Atmel scheme, where, for example, a program that would overflow the Flash memory 170 cannot be stored in free space in the internal data EEPROM 174.

Whether or not internal data or program code is read from the NVM 220 depends on the memory access mode. In particular, as in the prior art, internal program code can be read from the NVM 220 in response to internal program fetch operations from the internal bus (not shown) or program byte read operations implemented with MOVC instructions (of the 8-bit or 16-bit variety). Unique to the present invention, internal data can be read from and written to the NVM 220 in response to one or more data access instructions. The ability of the present invention to provide this extended data storage capability in a manner that is compatible with the 8051 memory model is based in part on the configuration of the SFR 240.

The SFR 240 is a dedicated register array in the internal data area 206 that includes different special function registers required by the 8051 standard (not shown) and an additional non-volatile memory flag (NVMEN) 242 defined by the present invention. Also included is an SFR (8 bits) used as the high byte of the internal data address. This high byte data address is combined with the data address (8 bits) in the traditional internal data transfer instructions to access a maximum of 64 K(i.e., address space of 16-bit address) bytes of data in the internal non-volatile memory. In one embodiment, the NVMEN flag 242 is a single bit in the SFR 240 that can be set by either external or internal programs. The state of the NVMEN flag 242 determines whether a data memory access is into the non-volatile memory 220' or volatile memory (e.g., into of the internal data SRAM 230, SFR 240 or external data SRAM 212). There are many different possible ways of designing a memory access scheme to take advantage of the NVMEN flag 242. Two such embodiments are now described. These embodiments are only illustrative and are not intended to limit the scope of the present invention, which encompasses these and similar, undescribed implementations. Both embodiments can be used for in-system programming.

In a first embodiment, the NVMEN flag 242 indicates whether or not a data access is to be performed in the conventional manner (e.g., as if there were no data NVM 220) or in the NVM 220. In this embodiment, when the NVMEN flag 242 is set, the data access is into the NVMEN. When the NVMEN flag 242 is cleared, the data access is into the internal data SRAM 230 or the SFR 240, depending on the particular memory access instruction. Table 1 shows the particular memory circuit that is accessed for the different combinations of memory access instruction type and NVMEN setting.

TABLE 1

| NVMEN | Instruction | Memory Accessed |
|---|---|---|
| Set | Any instruction that can be used to access the internal SRAM 230 | NVM 220 |
| Cleared | Any instruction that can be used to access the internal SRAM 230 | Internal SRAM 230 or SFR 240 |

In a second embodiment, the NVMEN flag 242 indicates whether or not a MOVX data access is to be performed in the conventional manner (e.g., into the external SRAM 212) or into the NVM 220. In this embodiment, when the NVMEN flag 242 is set, the MOVX memory access is into the NVM 220. When the NVMEN flag 242 is cleared, the MOVX memory access is into the external SRAM 212. Table 2 shows the particular memory circuit that is accessed for the different NVMEN setting.

TABLE 2

| NVMEN | Instruction | Memory Accessed |
|---|---|---|
| Set | MOVX | NVM 220 |
| Cleared | MOVX | External SRAM 212 |

Table 3 summarizes some features of embodiments of the present invention as compared to the Atmel microcontroller technology.

TABLE 3

| Feature | Atmel Technology | Present Invention |
|---|---|---|
| A single, on-chip non-volatile memory is shared by both program code and data | No | Yes |
| Program code can be altered by software | No | Yes |
| Internal non-volatile data can be accessed (read and altered) by any instruction that is for internal SRAM access | No | Yes |

Referring to Table 3, embodiments of the present invention use the same on-chip non-volatile memory for both internal program code and data. This feature supports in-system programming of the program code and data under the control of microcontroller software. In contrast, in-system programming in Atmel devices is controlled by external circuits. Eliminating the need for external circuits reduces the cost of system design. Additional cost savings result from the present invention's use of the microcontroller to control in-system programming.

Another advantage of using a single physical memory 220 for internal program code and data is that the program code can be accessed (read or written) using any of the instructions that can be used to access the internal data SRAM. In contrast, in the Atmel system program code stored in the Flash memory can only be accessed using the MOVC instruction and internal data stored in the EEPROM can only be accessed with MOVX instruction.

Another advantage of the present invention is that the NVM 220 can be entirely used to store data, in which case all program code is stored in the external program SRAM. The microcontroller has a external access (EA) pin (FIG. 3), which, when asserted, tells the microcontroller processor that all program code is to be fetched from the external program SRAM (normal mode). When the EA pin is not asserted, the program code is fetched from the internal NVM 220 (programming mode).

Figure 1:
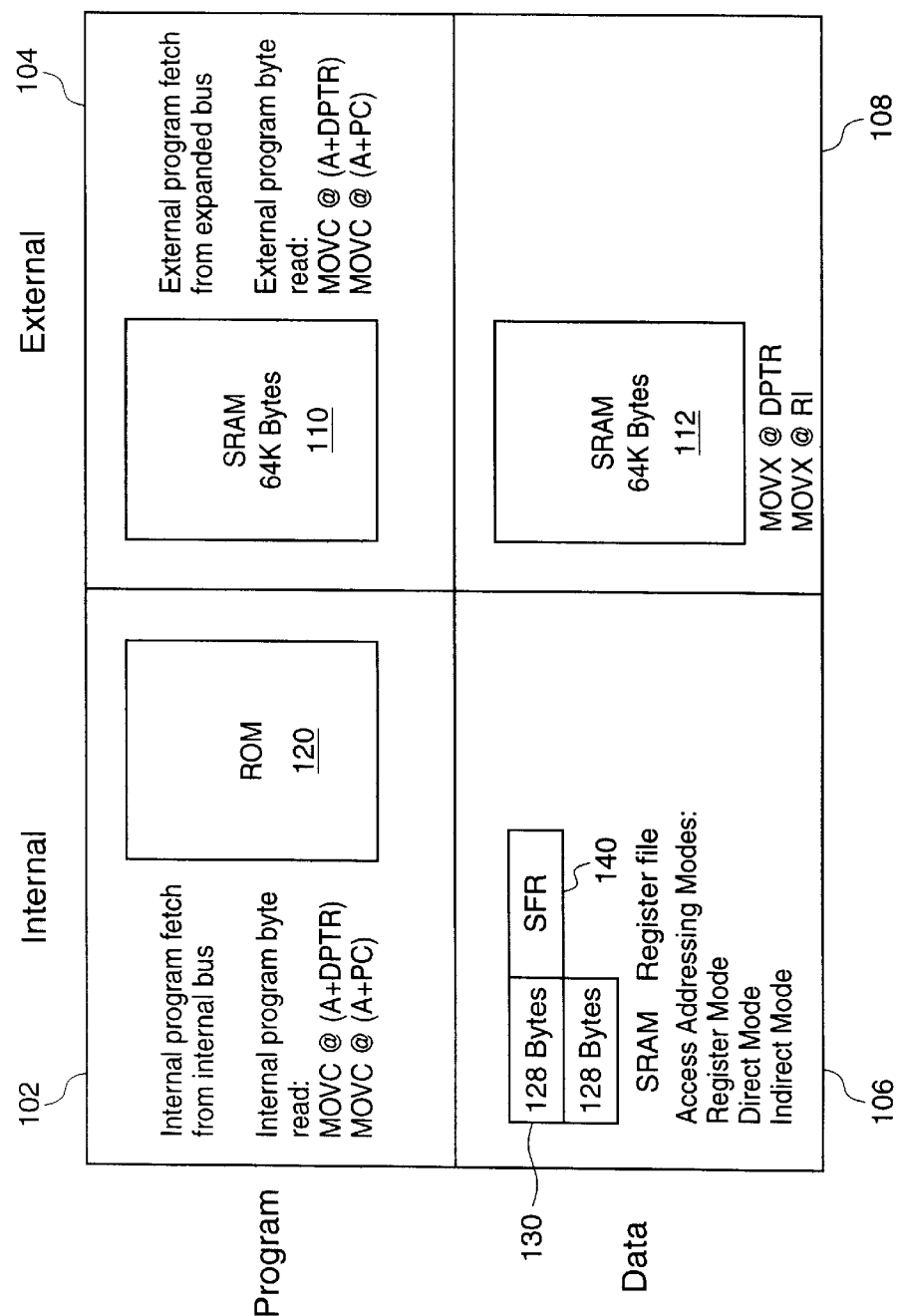
FIG. 1 is a block diagram showing the memory scheme adopted by traditional prior art 8051 microcontroller.
Figure 2:
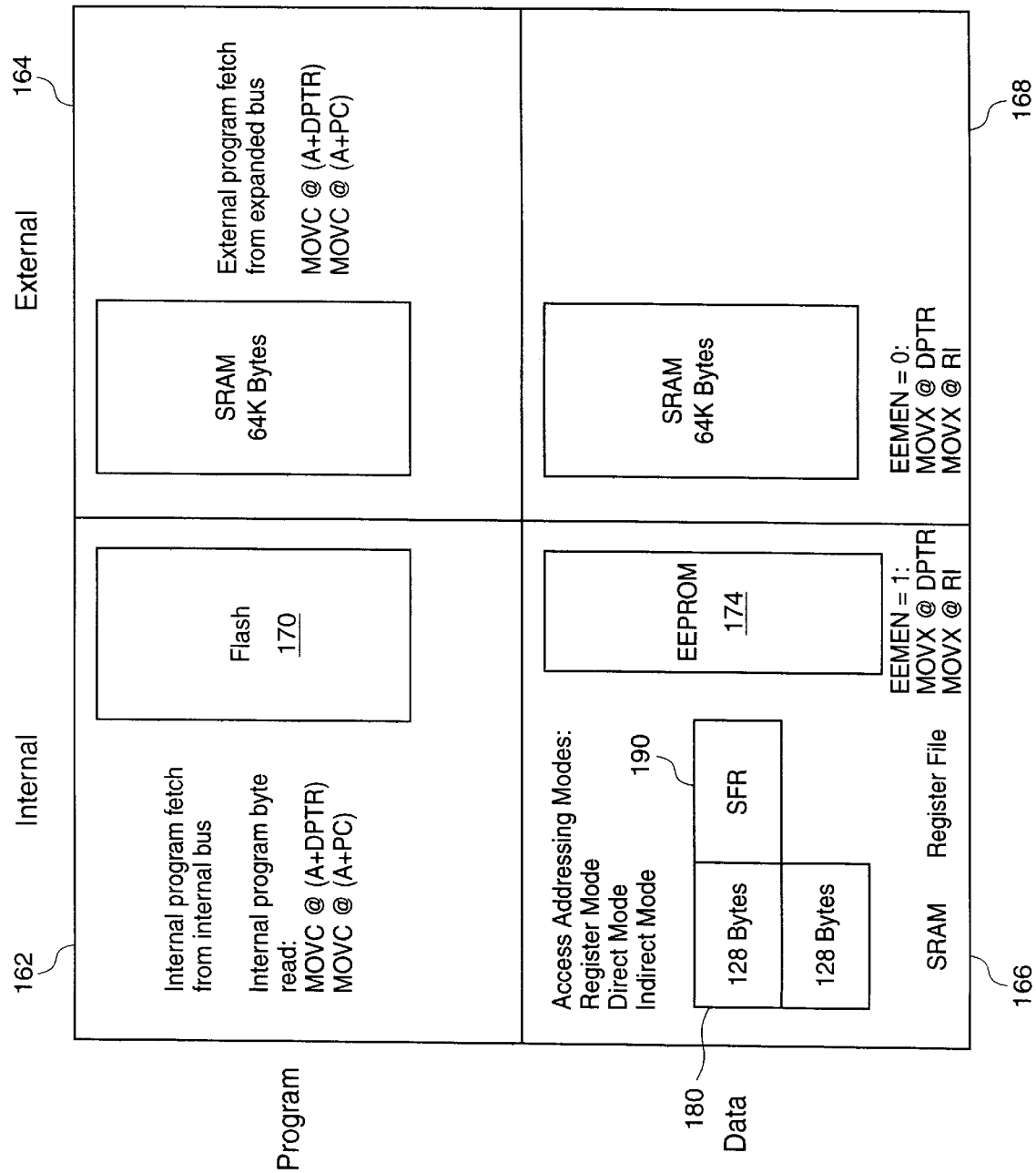
FIG. 2 is a block diagram showing the memory scheme adopted by the Atmel C51 family of microcontrollers.

Yet another advantage of the present system is that both the program code and internal data stored in the NVM 220 can be reprogrammed in place by software. This feature together with an on-chip serial port provides in-system programming capability for both the program code and internal data in the on-chip NVM. In traditional systems, such as the Atmel system (FIG. 2), the program code stored in the Flash memory 170 is read-only and cannot be reprogrammed in-place, by software or via a serial port. How the advantages of the present invention are provided in one embodiment is now described with reference to FIG. 4.

Figure 4:
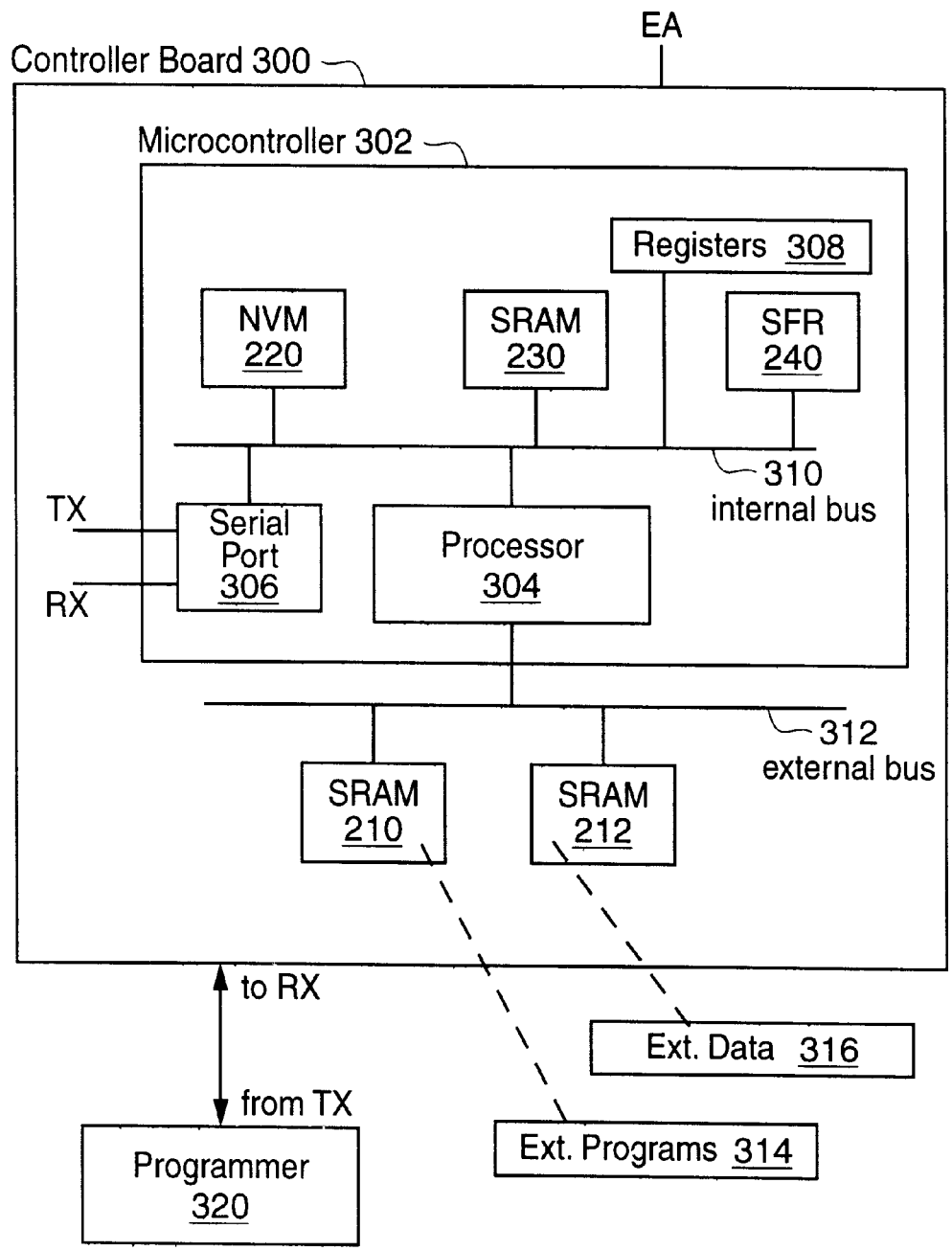
FIG. 4 is a block diagram showing an electronic system incorporating the 8051 controller of the present invention.

Referring to FIG. 4, there is shown a hardware block diagram of a microcontroller system implemented in accordance with the present invention. The microcontroller system includes a system board 300 on which is installed a microcontroller 302 and SRAMS 210, 212, which are interconnected via an external bus 312. The microcontroller 302 includes the NVM 220, SRAM 230, SFR 240, described above, a processor 304, serial port 306 (e.g., a UART) and registers 308, all of which are coupled via an internal bus 310. The SRAMs 210, 212 respectively store external programs and data 314, 316. The system board 300 has an external connection to a programmer 320, which is coupled to the microcontroller 302 via transmit (TX) and receive (RX) connections of the serial port 306.

The processor 304, serial port 306 and registers 308 are conventional in implementation and operation and are not described further herein. For example, the serial port could be implemented as a Universal Asynchronous Receive Transmit (UART). The programmer 320 could be any type of peripheral device, including another microcontroller, computer or network connection, which is capable of programming the NVM 220 via the serial port 306. Because the NVM 220 can be programmed using an external device 320 configured to communicate via an industry standard serial interface, a microcontroller configured in accordance with the present invention is more readily programmed than the Atmel microcontroller, which uses a specialized SPI (Serial Port Interface) for programming.

The processor 304 executes programs stored in the internal program memory 220 and the external program memory 210; these programs read/write data from/to the NVM 220, the internal SRAM 230, the external data SRAM 212, the registers 308 and the SFR 240. A description of representative contents of the NVM 220 is now provided with reference to FIG. 5.

Referring to FIG. 5, there is shown a block diagram of the NVM 220, which includes an internal program area 330, a data area 360 and a boot program section 380. The program area 330 includes internal programs 340 and internal data 350, which can be used by the internal programs 340 or by external programs 314. The data area 360 includes internal data 370, which can be accessed by program code stored in the NVM 220 or the external SRAM 210. The boot program section 380 is configured so that it cannot be overwritten by NVM programming operations. This is important in one embodiment where the NVM 220 is implemented as a single block of memory that is programmable as a whole. In this embodiment, the programs that perform programming operations, which must not be overwritten during programming, are stored in the boot program section 380. In the illustrated embodiment, the boot program section 380 includes a serial port interrupt routine 382, with a RX (receive) interrupt handler 384 and a TX (transmit) interrupt handler 386. The RX interrupt handler 384 responds to the incoming information and writes the received data into the NVM 220 (using MOVX or other data transfer instructions as described above). Different configurations of the RX interrupt handler 384 are described below with reference to FIGS. 7A–7C.

In one embodiment described above, in which the NVM 220 is used entirely for data storage, all of the internal programs 340 are stored in the external SRAM 210. Alternatively, the NVM 220 can be used solely for internal program 340 storage.

In yet another embodiment, a program can be run in one of two different modes: normal mode and programming mode. In the normal mode, the EA (External Access) pin is held high and the internal program code is executed. In the programming mode, the EA pin is held low and the external program code is executed. In the programming mode, the NVMEN bit is set and the MOVX (or other appropriate instructions) can be used for reconfiguring the internal program code.

Figure 7A:
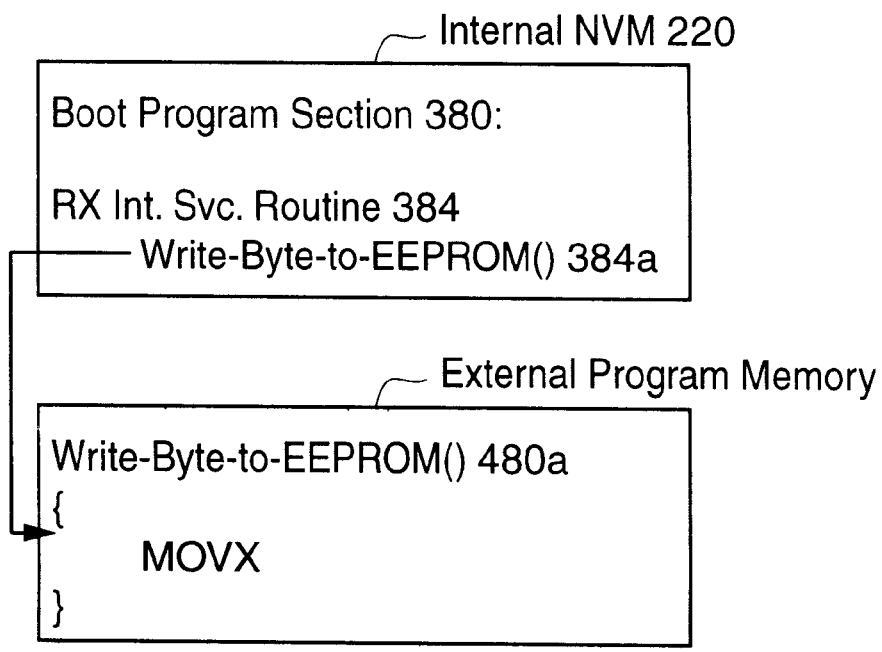
FIGS. 7A–7C are block diagrams illustrating different methods in which the RX interrupt service handler code can be distributed between the internal NVM and the external program memory.

Referring to FIG. 7A, there is shown a memory block diagram of an embodiment where the RX interrupt handler code is divided between the internal NVM 220 and the external program memory 210. In this embodiment, the NVM 220 includes a boot program section 380 in which is stored an RX interrupt service routine 384. The RX interrupt service routine 384 includes a call 384 to a Write-Byte-to-NVM routine that reprograms the NVM 220. In this embodiment, the Write-Byte-to-NVM routine 480a is stored in the external program memory 210. Whenever an RX interrupt occurs, the processor 304 executes the RX interrupt service routine 384a, which in turn calls the Write-Byte-to-NVM routine 480a. The Write-Byte-to-NVM routine 480a programs the NVM 220 with the program instructions received over the serial interface. An advantage of this memory configuration is that the Write-Byte-to-NVM routine 480a can be freely re-programmed. Another advantage of this memory configuration is that, during programming, which occurs under control of the program 480a, the microprocessor can continue to fetch program 480a instructions as the memory 220 being programmed is different from the memory 210 in which the program 480a resides.

Figure 7B:
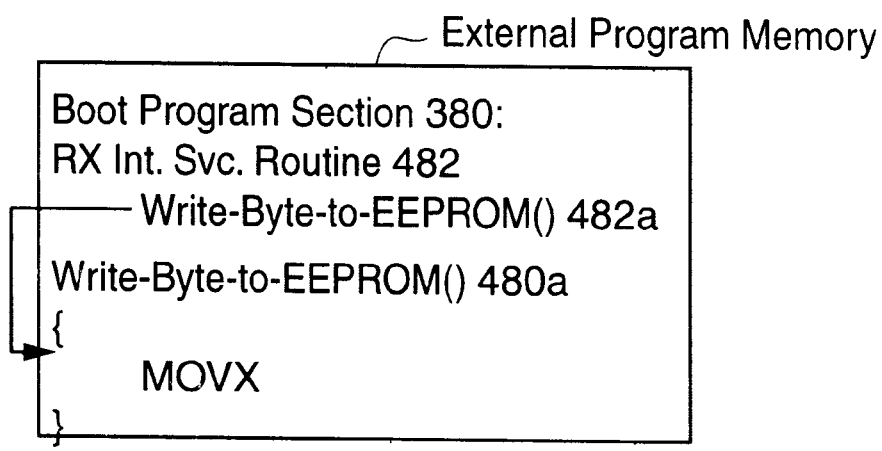

Referring to FIG. 7B, there is shown a memory block diagram of an embodiment where the boot program including the RX interrupt handler code is stored completely in the external program memory 210. In this embodiment, the external program memory 210 includes an RX interrupt service routine 482 and a Write-Byte-to-NVM routine 480a. As in the embodiment of FIG. 7A, the RX interrupt service routine 482 includes a call 384 to the Write-Byte-to-NVM routine 480a, which reprograms the NVM 220. Whenever an RX interrupt occurs, the processor 304 executes from external memory 210 the RX interrupt service routine 482, which in turn calls the Write-Byte-to-NVM routine 480a. The Write-Byte-to-NVM routine 480a programs the NVM 220 with the program instructions received over the serial interface. An advantage of this memory configuration is that the Write-Byte-to-NVM routine 480a can be freely re-programmed. Another advantage of this memory configuration is that, during programming, which occurs under control of the program 480a, the microprocessor can continue to fetch program 480a instructions as the memory 220 being programmed is different from the memory 210 in which the program 480a resides. Yet another advantage of this embodiment is that, because the interrupt service routine 482 is not stored in the NVM 220, the boot program section 380 can be eliminated or reduced in size to allow more internal data or programs to be stored in the NVM 220.

Figure 7C:
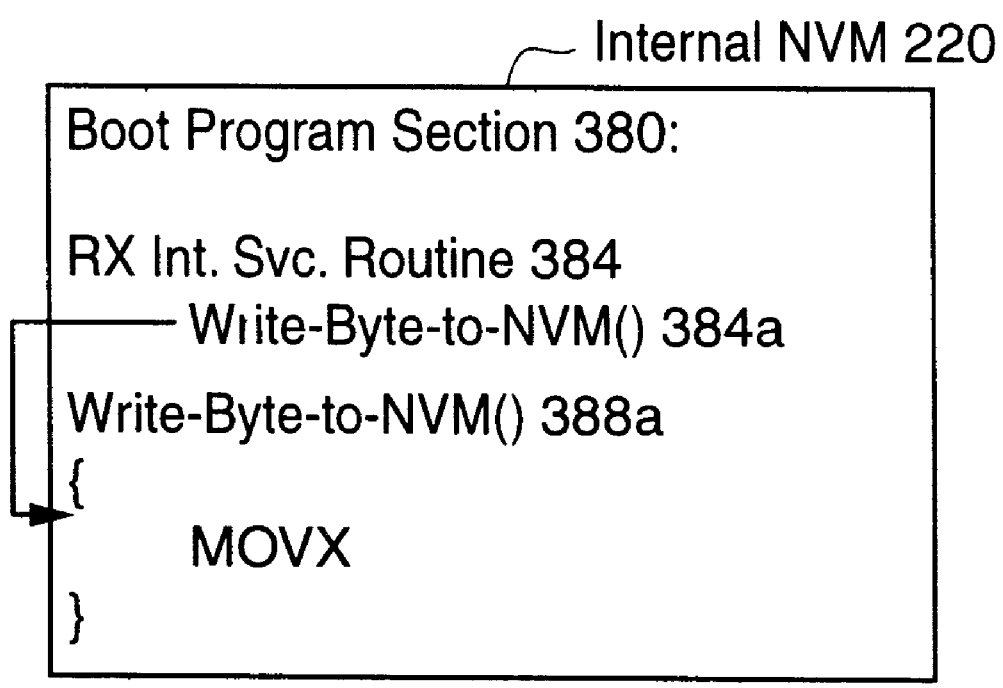

Referring to FIG. 7C, there is shown a memory block diagram of an embodiment where the RX interrupt handler code is stored completely in the internal NVM 220. In this embodiment, which corresponds to the memory configuration of FIG. 5, the boot program section 380 of the internal NVM 220 includes an RX interrupt service routine 384 and a Write-Byte-to-NVM routine 388a. As in the embodiment of FIG. 7A, the RX interrupt service routine 384 includes a call 384a to the Write-Byte-to-NVM routine 388a, which reprograms the NVM 220. Whenever an RX interrupt occurs, the processor 304 executes the RX interrupt service routine 384, which in turn calls the Write-Byte-to-NVM routine 388a. The Write-Byte-to-NVM routine 388a programs the NVM 220 with the program instructions received over the serial interface.

Advantages of the present invention include:
(1) sharing of on-chip NVM between program code and internal non-volatile data which results in more efficient use of on-chip NVM
(2) the internal program code 340 can be re-programmed in place,
(3) internal data 350 stored in the program area can be re-programmed in place, and
(4) internal data 370 stored in the data area can be re-programmed in place.
(5) reduction of off-chip circuitry for the control of the above re-programming.

These advantages are made possible by the fact that, in the present invention, the internal program code and the internal data share the same physical memory, the NVM 220 and the fact that the same instructions used in the traditional architecture can be used for data transfer in the new architecture. As a result, both internal program code and data in the NVM 220 can be manipulated using any of the memory access instructions traditionally employed to access the internal SRAM 230. These instructions include all data access instructions (read or write), arithmetic instructions, logical instructions and data transfer instructions. Stated another way, in the present invention any instruction that can access the internal memory or external data memory can also access the NVM 220.

Additionally, in contrast with traditional 8051 systems, such as the Atmel system, the NVM 220 can be Flash memory or EEPROM due to the ability of the programmer 320 to employ a wide range of instructions to manipulate the data in the NVM 220. For example, if the NVM 220 were a Flash memory, the process of updating a single byte could proceed as follows:
(1) transfer the Flash memory page including the data to be modified into an internal buffer;
(2) modify the target data in the internal buffer;
(3) copy the modified target data back to the Flash memory.

As mentioned above, this programming operation could not be executed in the Atmel scheme.

An embodiment for reprogamming the internal NVM 220 under control of an external programmer 320 via the serial port 306 is now described with reference to FIG. 6.

Figure 6:
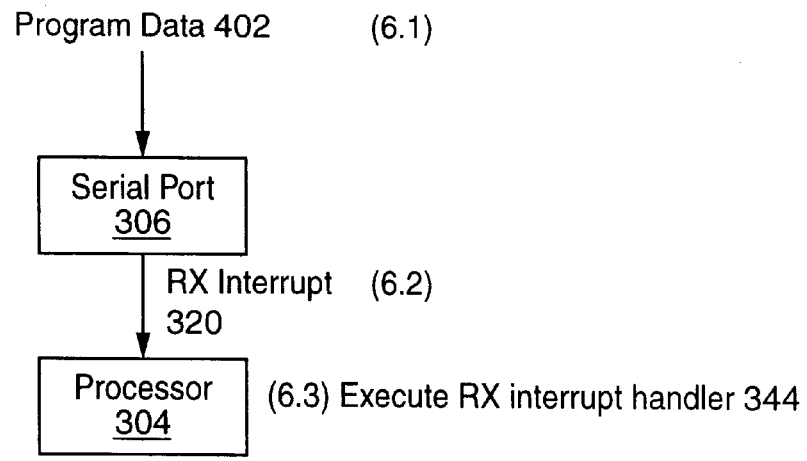
FIG. 6 is a flow diagram illustrating an embodiment of a method of in-system programming of the non-volatile memory 220 of FIG. 4 (i.e., 220/220' of FIG. 3)
Figure 6:
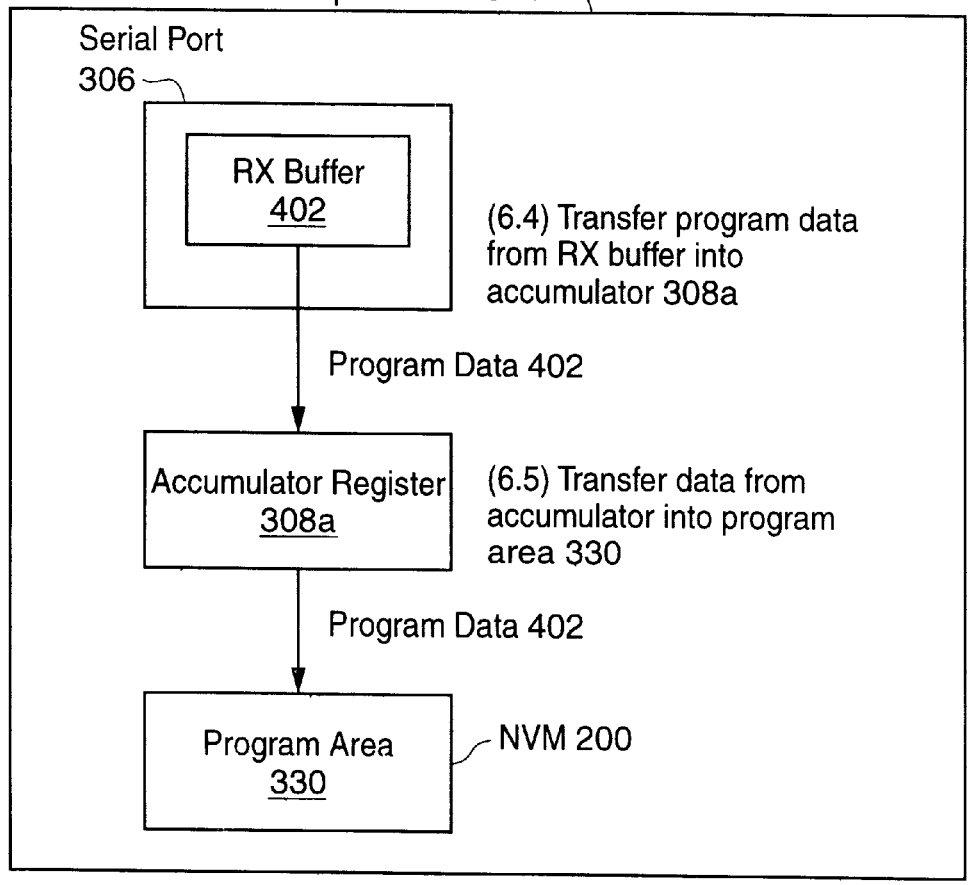

Referring to FIG. 6, there is shown a functional flow diagram illustrating an in-system programming method that can be implemented in an embodiment of the present invention. The blocks in this figure correspond to hardware blocks from FIG. 4. The block-to-block flows are the results of software instruction execution, such as the execution of an interrupt handling routine in response to a hardware interrupt, or are directed by an internal or external program 340, 314. Each action is associated with a reference number enclosed in parentheses; e.g., step "(6.1)" is the first described step of the method. The illustrated method is presumed to take place in response to instructions from the programmer 320 to re-program all, or a subset (as small as a byte), of an internal program 340 (FIG. 5).

The programmer 340 first sends the data 402 to be used for reprogramming the NVM 220 to the serial port 306 of the microcontroller board 300 (6.1). In response, the serial port 306 generates a receive data (RX) interrupt 320, which is coupled to the processor 304 (6.2). In the conventional manner, receipt of the interrupt 320 causes the processor 304 to execute a predetermined RX interrupt handling routine 344 (FIG. 5) (6.3), which is presumed to be an internal program 340, but could also be an external program 360. In one embodiment, the RX interrupt handler 344 transfers the program data 402 from a receive buffer 402 in the serial port (6.4) to an accumulator register 308a. The interrupt handler 344 then transfers the data 402 from the accumulator register 308a to the program area of the NVM 220 using any appropriate memory transfer instruction (6.5).

In the situation where the NVM 220 is Flash memory, the subset of the memory 220 to be programmed would have to be copied out to a buffer, modified therein, and copied back to the Flash memory as described above. Otherwise (e.g., if the NVM 220 were EEPROM), the subset of the memory can be written one byte at a time.

The illustrated method assumes the data 402 is provided by the external programmer 320. In an alternative embodiment, the data 402 for reprogramming the NVM 220 can be data stored in the SRAM 212, possibly by an internal or external program. In this case, the data 402 is simply transferred from the SRAM into the NVM using any of commands that can be used to transfer data to the SRAM via the internal bus. This enables the NVM 220 to be reprogrammed entirely with in-system software.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A microcontroller memory system, comprising:
   an internal volatile memory configured to store internal data; and
   an internal non-volatile memory configured to store in any proportion the internal data and internal program code;
   wherein the internal data and the internal program code stored in the internal non-volatile memory are accessible to any microcontroller instruction that can be used to access the internal data in the internal volatile memory;
   wherein the internal non-volatile memory comprises a single block of memory including a boot program section that cannot be overwritten by non-volatile memory programming operations and further wherein the boot section is programmed with a receive (RX) interrupt service routine configured to call an NVM write routine whenever an RX interrupt is received by a microcontroller in which the memory system is implemented, the NVM write routine being configured to write into the NVM information received by the microcontroller in conjunction with the RX interrupt.

2. The microcontroller memory system of claim 1, further comprising an external program memory wherein the NVM write routine is stored.

3. The microcontroller memory system of claim 2, wherein the information received by the microcontroller is at least one of:
   program code; and
   data.

4. A microcontroller memory system comprising:
   an internal volatile memory configured to store internal data; and
   an internal non-volatile memory configured to store in any proportion the internal data and internal program code;
   wherein the internal data and the internal program code stored in the internal non-volatile memory are accessible to any microcontroller instruction that can be used to access the internal data in the internal volatile memory; and
   an external program memory programmed with a receive (RX) interrupt service, routine and an NVM write routine, the RX interrupt service routine being configured to call the NVM write routine whenever an RX interrupt is received by a microcontroller in which the memory system is implemented, the NVM write routine being configured to write into the NVM information received by the microcontroller in conjunction with the RX interrupt.

5. The microcontroller system of claim 4, wherein the information received by the microcontroller is at least one of:
   program code; and
   data.

6. A microcontroller memory system, comprising:
   an internal volatile memory configured to store internal data; and
   an internal non-volatile memory configured to store in any proportion the internal data and internal program code;
   wherein the internal data and the internal program code stored in the internal non-volatile memory are accessible to any microcontroller instruction that can be used to access the internal data in the internal volatile memory;
   and further wherein the boot program section comprises an NVM write routine that is executed by a microcontroller in which the memory system is implemented whenever the microcontroller determines by external interrupt through the serial port that information has been received by the microcontroller, the NVM write routine being configured to write the information into the NVM.

* * * * *